Aug. 25, 1931.    E. G. OAKLEY    1,820,673
WASTE FITTING FOR SINKS OR THE LIKE
Filed Nov. 8, 1926    2 Sheets-Sheet 2
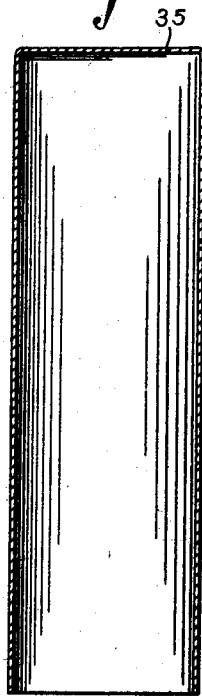
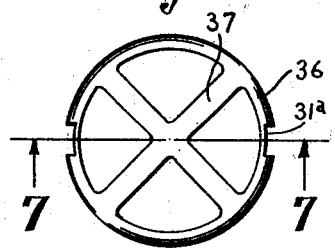
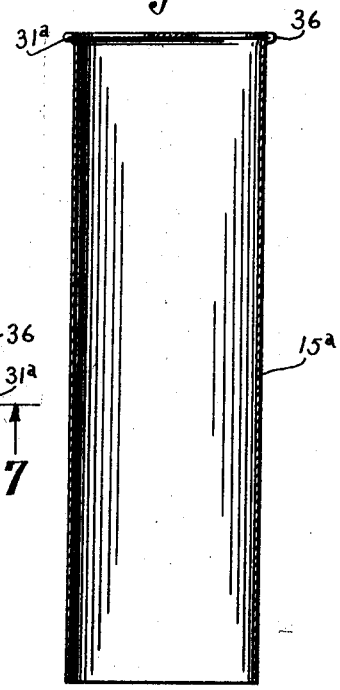
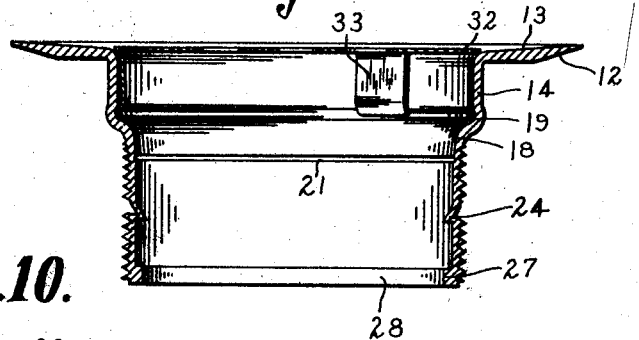
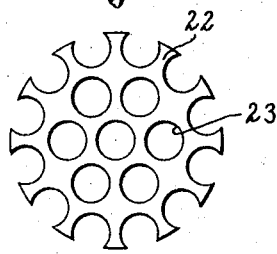

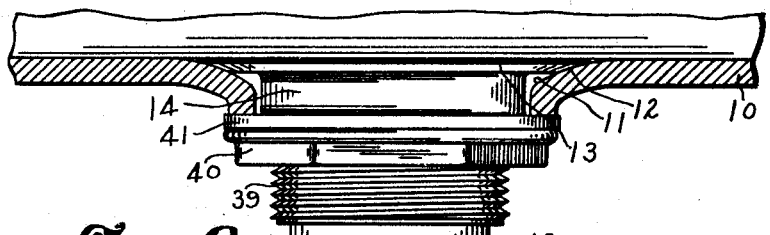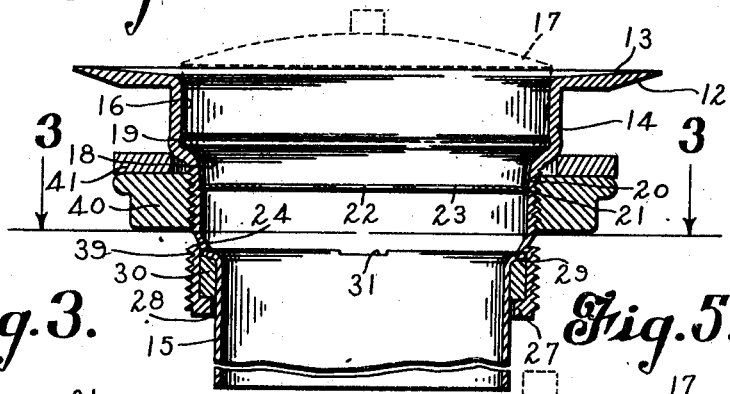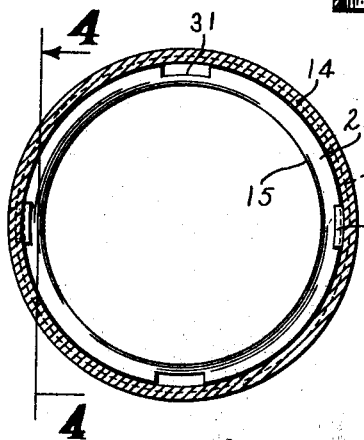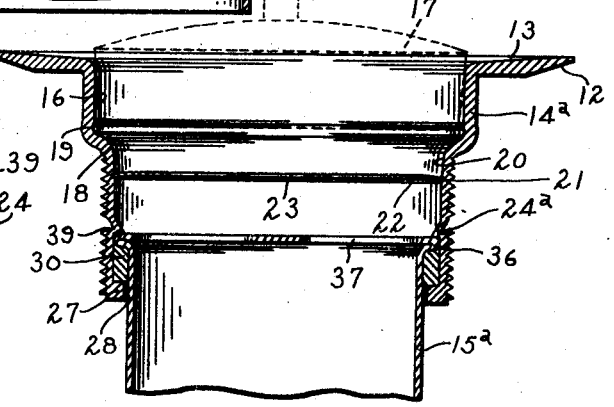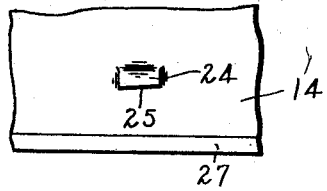

Patented Aug. 25, 1931

1,820,673

UNITED STATES PATENT OFFICE

ERASTUS G. OAKLEY, OF SOUTHPORT, CONNECTICUT, ASSIGNOR TO BRIDGEPORT BRASS COMPANY, OF BRIDGEPORT, CONNECTICUT

WASTE FITTING FOR SINKS OR THE LIKE

Application filed November 8, 1926. Serial No. 147,045.

This invention relates to a drain or waste fitting for sinks, and while in some respects it is especially adapted for use in connection with kitchen sinks, it will be understood that the invention is also applicable to waste fittings for lavatories, bath tubs, or in fact, drain fittings of any kind.

One of the primary objects of the invention is to provide a drain fitting which consists of a plug or bushing adapted to pass through and be connected to the sink or other article, which is to be drained, and a waste pipe, the connection between the waste pipe and plug being of such character that there will be no likelihood of leakage.

Another object of the invention is to provide a waste fitting of the character described, which will be economical to manufacture and the joints of which shall be water tight so that there will be no likelihood of leakage.

A still further object of the invention is the provision of a waste fitting of this character wherein the drain pipe may be easily and readily connected to and disconnected from the plug or bushing, and when connected therewith, a water tight joint will be effected.

A still further object of the invention is to provide a waste fitting of this character, wherein a strainer may be detachably held by the fitting below the upper surface thereof, so that if desired, a stopper may be inserted into the bushing above the strainer. The strainer is preferably detachably held in place so that it may be readily removed when occasion requires.

To these and other ends the invention consists in the novel features and combination of parts to be hereinafter described and claimed.

In the acompanying drawings:

Fig. 1 is a sectional view of a sink or the like, provided with a waste fitting embodying my invention, showing the application of the fitting to the sink;

Fig. 2 is a sectional view through the fitting;

Fig. 3 is a transverse sectional view on line 3—3 of Fig. 2;

Fig. 4 is a fragmentary sectional view on line 4—4 of Fig. 3;

Fig. 5 is a view simlar to Fig. 2, showing a slightly modified form of my invention;

Fig. 6 is a cross sectional view of a drawn shell employed in the manufacture of the waste pipe, shown in Fig. 5;

Fig. 7 is a cross sectional view of the completed pipe, the view being taken on line 7—7 of Fig. 8;

Fig. 8 is a top plan view of the completed waste pipe;

Fig. 9 is a sectional view of the bushing or plug showing a second strainer inserted in the top of the bushing above the lower strainer;

Fig. 10 is a plan view of a strainer customarily employed with my fitting.

To illustrate a preferred embodiment of my invention, I have shown a portion of the bottom of a sink at 10, having an opening 11 therethrough, provided with a beveled edge which forms a seat for the beveled edge 12, provided at the under side of a laterally extending flange 13, on the plug or bushing 14 of the fitting.

The fitting itself comprises two main parts, one of which is a plug or bushing 14 just referred to, which fits into the sink opening and makes a water tight connection therewith, and the other comprising a waste or drain pipe 15 designed to be connected to the lower end of the plug 14.

While the form of the bushing 14 may be changed to some extent without departing from my invention, I prefer to provide it at its upper end with a somewhat enlarged substantially cylindrical portion 16 to provide a stopper seat, upon which may be seated a stopper 17, shown in dotted lines in Fig. 2, when it is desired to close the drain. Below the wall 16 is provided an inwardly projecting shoulder 18, at the upper edge of which the wall of the bushing is slightly undercut at 19 for a purpose to be described hereinafter. Below the shoulder 18, the inner surface 20 of the plug is slightly tapered inwardly so that the bore gradually contracts toward an annular undercut groove 21 designed to receive the peripheral edge of a strainer 22. When the strainer is inserted in place, it will drop freely into the portion of the bushing surrounded by the surface 20. As the wall gradually tapers inwardly, the strainer upon being pushed downwardly will begin to bind slightly as it approaches the groove 21, and upon reaching the groove 21 will snap into place within this groove so that it will be frictionally retained therein. The form of the strainer 22 is shown in Fig. 10, and by inserting an instrument through an opening 23 therein, the strainer will be readily removed from the bushing when desired.

The wall of the bushing below the strainer 22 is substantially cylindrical in shape, but is provided with inwardly projecting lugs 24. Any number of these lugs may be provided, two, however, being shown in the drawings. At their lower ends, these lugs are provided with an abrupt surface 25 projecting directly inwardly from the wall of the bushing, and as shown in Fig. 4, this surface may be slightly beveled downwardly to assist in making a tight joint, as will appear more fully hereinafter. It will be understood, however, that the bevel or inclination of the lower surface of these lugs may be omitted, if desired.

Adjacent its lower end the bushing is provided with an inwardly directed annular flange 27 having an opening 28 to permit the passage therethrough of the waste or drain pipe 15. This pipe will ordinarily be inserted into the plug from the upper end thereof, and is provided at its upper end with an outwardly projecting flange 29, designed to overlie the flange 27 on the bushing. Between these two flanges may be inserted a packing washer 30 of rubber or the like, the washer being compressed about the pipe 15 between the flanges upon the bushing and pipe to provide a water-tight joint.

The flange 29 upon the pipe is provided with recesses 31, agreeing in number with the lugs 24, the recesses being so positioned that they may be brought into register with these lugs, and of the proper size to permit the lugs to pass therethrough. As shown in Fig. 2, the lower end of the waste pipe 15 is left plain so that it may pass through the opening 28 of the flange 27.

In assembling the parts, the packing washer 30 is placed upon the pipe 15, and the latter inserted through the upwardly directed mouth of the bushing 14. The recesses 31 are brought into register with the lugs 24, upon the wall of the bushing, and the pipe is drawn downwardly until the flange 29 thereof lies below the shoulder 25 on the lugs, which serves to compress the packing washer 30 between the flanges 27 and 29, so that a water-tight joint is effected. The pipe 15 is then turned on its axis into the position shown in Fig. 3, where the recesses 31 no longer register with the lugs 24, and the pipe will then be held in this position by the engagement of the flange 29 below the shoulders 25. When the lower surfaces 25 of the lug are inclined or beveled, as shown in Fig. 4, they will serve when the pipe is turned to cam the flange 29 downwardly so as to exert a compressing force upon the washer 30. In any event, however, when the pipe 15 is in place, this washer will be tightly compressed between the flanges 27 and 29, so that a water-tight compression joint is effected.

The strainer 22 may then be slipped into place, this member springing into the groove 21 so as to be frictionally held in position. As clearly shown in Fig. 2, the strainer is then seated some distance below the mouth of the bushing 14, and the stopper 17 may be inserted in the bushing without removing the strainer. In some instances, it may be desirable to use a strainer of the form shown in the patent to Clark, No. 1,224,603, shown at 32 in Fig. 9, and having depending lugs 33, the ends of which enter the under-cut groove 19 below the wall 16 to hold the strainer in place. A strainer of this character may be used in connection with or independently of the strainer 22. That is, without removing the strainer 22 from the fitting, the stopper 17 or the strainer 32 may be inserted in the mouth of the bushing 14.

In Fig. 5 of the drawings, I have shown a slightly modified form of waste pipe 15ª. This waste pipe may be made by drawing the shell 34, shown in Fig. 6, from a suitable blank. As ordinarily made, the shell will be closed at one end, as shown at 35. At the closed end of the shell the wall thereof is flared outwardly and folded upon itself to provide an outwardly extending flange 36 of two-ply thickness. The metal of the closed end of the shell is then cut away to provide the bars 37, and the recesses 31ª are provided in the flange 36 to permit the completed waste pipe 15ª to be inserted in the bushing 14ª below the lugs 24ª, as shown in Fig. 5. It will be understood that the bushing 14ª is substantially identical with the bushing 14. The principal difference between the modified form of my invention shown in Fig. 5, and the form shown in Fig. 2, resides in the method of the construction of the pipe 15ª and the provision of the two-ply upper flange 36 and the bars 37 thereon.

It will be understood that the exterior surface of the bushing may be threaded, as shown at 39, to receive the nut 40 to clamp the bushing to the sink, lavatory, bath tub, or other article with which it is used. A washer 41 may be placed about the bushing above the nut 40.

Heretofore it has been customary to utilize the threads 39, cooperating with nut 40 in clamping the bushing in its opening or socket in the sink bottom, as a means for securing the waste pipe to the bushing, for which purpose an additional nut was provided engaging the threads 39 and a flange on the upper end of the waste pipe in such a manner as to permit the upper end of the waste pipe to be abutted against the bottom of the bushing and forced into contact therewith. In such prior constructions it was impossible to thread the nut 40 on the bushing after the waste pipe had been secured thereto, as the pipe securing nut stood in the way of the bushing positioning nut. In my improved device, however, the bushing positioning nut 40 can be placed on and removed from the bushing without disturbing the connection between the waste pipe and the bushing, and the connection between the waste pipe and bushing can be made and disassembled regardless of the presence or absence of the clamping nut 40 on or from the bushing, and, if on the bushing, regardless of its position thereon. The bushing positioning nut can be placed in position on the bushing either before or after the waste pipe is secured in place, and if desired, the fixture can be removed from the sink without disturbing the connection between the upper end of the pipe and the bushing, all of which increases the facility and convenience with which the fixture can be installed and removed. In my improved device, the waste pipe, instead of abutting the bushing bottom, extends within the bushing telescopically, having an internal joint therewith disposed entirely within the lines of the lower threaded end portion of the bushing, the threads of which cooperate with only one nut.

While I have shown and described some preferred embodiments of my invention, it will be understood that it is not to be limited to all the details shown, but is capable of modification and variation within the spirit of the invention and within the scope of the appended claims.

What I claim is:

1. In a fitting for sinks or the like, a bushing having an inwardly extending flange adjacent its lower end, a pipe insertable in the upper end of the bushing having an outwardly extending flange of an external diameter larger than the internal diameter of the bushing flange, a packing member disposed between said flanges, and means on the bushing engaging the pipe flange to retain the pipe member within the bushing with the packing member compressed between the flanges.

2. A waste fitting for sinks comprising a hollow plug having an inwardly directed flange at the lower end thereof, a drain pipe inserted through the upper end of the plug and having its upper end disposed within the plug, said pipe having a flange overlying the flange of the plug, said pipe flange having an external diameter larger than the internal diameter of the plug flange, a packing member disposed between said flanges, and means secured to the wall of the plug to engage the pipe flange to hold the pipe in place, and to wedge the pipe flange toward the plug flange.

3. In a pipe fitting for sinks, a plug having an inwardly directed flange adjacent its lower end, a waste pipe having its upper end disposed within the plug and having an outwardly directed flange at said end, projections provided on the wall of the plug above the flange, and said pipe flange having an external diameter larger than the internal diameter of the plug flange and being provided with recesses to receive said projections when the pipe is inserted within the plug whereby the pipe flange may be lodged below the projections by a turning motion.

4. A sink plug having an inwardly directed flange adjacent its lower end, and projections upon the inner wall thereof adjacent the flange, a drain pipe having an outwardly directed flange adjacent its upper end, said pipe flange being of larger external diameter than the internal diameter of the plug flange, said pipe being insertable through the upwardly directed mouth of the plug, said pipe flange having recesses to clear said projections when so inserted whereby the pipe flange may be lodged below said projections when the pipe is rotated, and a packing member compressed between the flanges.

5. A waste fitting for sinks or the like, comprising a plug and a pipe, said plug having an inwardly projecting flange at its lower end, and said pipe having a part of larger external diameter than the internal diameter of the plug flange and being inserted through the upper end of the plug and projecting from the lower end thereof, a packing member disposed within the plug about the pipe, and cooperating members on the plug and pipe to compress said packing member and make a leak-tight joint.

6. A waste fitting for sinks comprising a hollow plug having an inwardly directed flange at its lower end, a waste pipe inserted through the upper end of the plug and projecting from the lower end thereof, said pipe being provided at its upper end with an outwardly directed flange larger than the internal diameter of the plug flange, and means to hold the pipe in place including cooperating projections and recesses provided upon the pipe flange and the wall of the plug, and a washer compressed between the flanges of the plug and pipe.

In witness whereof, I have hereunto set my hand this 5th day of November, 1926.

ERASTUS G. OAKLEY.